US012609631B2

(12) United States Patent
Su et al.

(10) Patent No.: US 12,609,631 B2
(45) Date of Patent: Apr. 21, 2026

(54) THREE-LEVEL POWER FACTOR RECTIFIER AND METHOD OF OPERATING THE SAME

(71) Applicant: DELTA ELECTRONICS, INC., Taoyuan City (TW)

(72) Inventors: Yi-Li Su, Taoyuan City (TW); Chien-Hung Liu, Taoyuan City (TW); Wen-Lung Huang, Taoyuan City (TW); Chang-Hung Liao, Taoyuan City (TW); Po-Yi Yeh, Taoyuan City (TW)

(73) Assignee: DELTA ELECTRONICS, INC., Taoyuan City (TW)

( * ) Notice: Subject to any disclaimer, the term of this patent is extended or adjusted under 35 U.S.C. 154(b) by 253 days.

(21) Appl. No.: 18/612,091

(22) Filed: Mar. 21, 2024

(65) Prior Publication Data

US 2025/0149996 A1      May 8, 2025

(30) Foreign Application Priority Data

Nov. 7, 2023    (CN) .......................... 202311470082.1

(51) Int. Cl.
| | |
|---|---|
| *H02M 1/38* | (2007.01) |
| *H02M 1/00* | (2006.01) |
| *H02M 1/42* | (2007.01) |
| *H02M 7/25* | (2006.01) |

(52) U.S. Cl.
CPC ........... *H02M 7/25* (2013.01); *H02M 1/0035* (2021.05); *H02M 1/38* (2013.01); *H02M 1/4208* (2013.01)

(58) Field of Classification Search
CPC ........ H02M 7/25; H02M 1/0035; H02M 1/38; H02M 1/4208
See application file for complete search history.

(56) References Cited

U.S. PATENT DOCUMENTS

| | | | |
|---|---|---|---|
| 12,294,295 B2 * | 5/2025 | Wrathall | ............. H02M 1/4225 |
| 2017/0155313 A1 * | 6/2017 | Mao | .................... H02M 1/4208 |
| 2022/0311330 A1 | 9/2022 | Lu et al. | |
| 2025/0080006 A1 * | 3/2025 | Yang | .................. H02M 1/4216 |

OTHER PUBLICATIONS

Office Action dated Nov. 21, 2024 of the corresponding Taiwan patent application No. 112142792.

* cited by examiner

*Primary Examiner* — Adolf D Berhane
(74) *Attorney, Agent, or Firm* — MUNCY, GEISSLER, OLDS & LOWE, P.C.

(57)      ABSTRACT

A three-level power factor rectifier includes a diode bridge arm, a bridge arm assembly, an input inductor, a capacitor bank, and a controller. The first bridge arm includes a first switch, a second switch, a third switch, and a fourth switch connected in series and in sequence. When the controller determines that a loading is less than a load threshold, the controller controls the three-level power factor rectifier entering a burst mode. In the burst sleep period, when a voltage value of an AC power source is greater than a first threshold, the first switch and the second switch are turned off; when the voltage value is less than a second threshold, the third switch and the fourth switch are turned on. When entering the burst period from the burst sleep period, the controller turns on the second switch and the third switch for a specific time period.

18 Claims, 11 Drawing Sheets

THREE-LEVEL POWER FACTOR RECTIFIER AND METHOD OF OPERATING THE SAME

BACKGROUND

Technical Field

The present disclosure relates to a three-level power factor rectifier and a method of operating the same, and more particularly to a three-level power factor rectifier with reduced voltage stress and a method of operating the same.

Description of Related Art

The statements in this section merely provide background information related to the present disclosure and do not necessarily constitute prior art.

Due to the rapid development of the information industry in recent years, power supplies play an important role. The power consumption of information or home appliances under no-load or light-load operation is gradually required to be reduced to a certain value. On the other hand, since harmonic suppression has limited in the international standard IEC61000-3-2, and the maximum rated harmonic current has stipulated, the information or home appliances must have power factor correction functions to improve the power factor of the AC power source.

With the advancement of distributed new energy power generation technology and the increasing number of DC power equipment, the demand for low-voltage DC power distribution is increasing. Traditional solutions usually use a transformer to convert a medium-voltage AC power (MVAC) into a low-voltage AC power, and then use an AC-to-DC converter to convert the low-voltage AC power into a low-voltage DC power. After that, power electronic transformers (PETs) were developed, which used high-frequency isolation circuits to realize power conversion devices from the medium-voltage AC power (MVAC) to the low-voltage DC power.

However, two-stage circuits are still used in existing power electronic transformers. The front-stage circuit uses a series-connected AC-to-DC converter to convert the input MVAC into multiple intermediate DC powers. The rear-stage circuit uses a DC-to-DC converter to convert the intermediate DC power into the low-voltage DC power. However, each converter needs to be equipped with corresponding medium-voltage isolation transformers, insulation parts, mechanical parts, fiber optic connectors, etc., and the greater the number of units, the higher the complexity and cost of the system. Since current commercial semiconductor devices have low withstand voltage levels, power electronic transformers can use three-level converters to increase the intermediate DC power level (>1.5 kV), thus reducing the number of cascaded circuits. The three-level converter can be operated by the controller to have a power factor correction function (i.e., a three-level power factor rectifier) to reduce power loss and increase the conversion efficiency of the three-level converter during the AC-to-DC conversion.

However, in the application of three-level power factor rectifier, when the load is in a light-load condition or a no-load condition, the power switching components of the three-level power factor rectifier need to withstand high voltage stress. The main reason is that the power switching component is affected by parasitic capacitance at the moment of conduction thereof, and the medium-voltage AC power is easily attached to both ends of the power switching component, resulting in the generation of instantaneous high voltage. In order to solve this problem, the current solution is usually to use higher specification power switching components. However, this will make the circuit volume of the three-level power factor rectifier larger and force the circuit cost to increase.

Therefore, how to design a three-level power factor rectifier and a method of operating the same to reduce the voltage stress on the power switching components of the three-level power factor rectifier when the load is in the light-load condition or the no-load condition has become a critical topic in this field.

SUMMARY

In order to solve the above-mentioned problems, the present disclosure provides a three-level power factor rectifier. The three-level power factor rectifier includes a diode bridge arm, a bridge arm assembly, an input inductor, a capacitor bank, and a controller. The diode bridge arm includes a first diode and a second diode connected in series. The bridge arm assembly is connected to the diode bridge arm in parallel, and the bridge arm assembly includes a first bridge arm and a second bridge arm. The first bridge arm includes a first switch, a second switch, a third switch, and a fourth switch connected in series and in sequence. The second bridge arm is connected to the second switch and the third switch in parallel, and the second bridge arm includes a first freewheeling component and a second freewheeling component connected in series and in sequence. The input inductor is coupled to a first node between the second switch and the third switch, is coupled to a second node between the first diode and the second diode, and is coupled to an input terminal that receiving an AC power source. The capacitor bank is connected to the bridge arm assembly in parallel, and the capacitor bank includes a first capacitor and a second capacitor connected in series and in sequence; a midpoint between the first capacitor and the second capacitor is coupled to the first freewheeling component and the second freewheeling component. The controller operates the first bridge arm in a burst mode, and the burst mode includes a burst period and a burst sleep period. When entering the burst period from the burst sleep period, the controller turns on the second switch and the third switch for a specific time period.

In order to solve the above-mentioned problems, the present disclosure provides a three-level power factor rectifier. The three-level power factor rectifier includes a diode bridge arm, a bridge arm assembly, an input inductor, a capacitor bank, and a controller. The diode bridge arm includes a first diode and a second diode connected in series. The bridge arm assembly is connected to the diode bridge arm in parallel, and the bridge arm assembly includes a first bridge arm and a second bridge arm. The first bridge arm includes a first switch, a second switch, a third switch, and a fourth switch connected in series and in sequence. The second bridge arm is connected to the second switch and the third switch in parallel, and the second bridge arm includes a first freewheeling component and a second freewheeling component connected in series and in sequence. The input inductor is coupled to a first node between the second switch and the third switch, is coupled to a second node between the first diode and the second diode, and is coupled to an input terminal that receiving an AC power source. The capacitor bank is connected to the bridge arm assembly in parallel, and the capacitor bank includes a first capacitor and a second capacitor connected in series and in sequence; a midpoint between the first capacitor and the second capacitor is coupled to the first freewheeling component and the second freewheeling component. The controller operates the first bridge arm in a burst mode, and the burst mode includes a burst period and a burst sleep period. When the controller controls the first bridge arm operating in the burst sleep period, and the AC power source in a positive half cycle and a voltage value of the AC power source is greater than a first threshold, the controller turns on the first switch and the second switch. When the controller controls the first bridge arm operating in the burst sleep period, and the AC power source in a negative half cycle and the voltage value of the AC power source is less than a second threshold, the controller turns on the third switch and the fourth switch.

In order to solve the above-mentioned problems, the present disclosure provides a method of operating a three-level power factor rectifier. The three-level power factor rectifier includes a diode bridge arm, a bridge arm assembly, and a capacitor bank, and the bridge arm assembly includes a first switch, a second switch, a third switch, and a fourth switch connected in series and in sequence to form a discharge path from an input inductor to the capacitor bank. The method includes steps of: turning on and turning off the first switch, the second switch, the third switch, and the fourth switch to convert an AC power source into a DC power source; determining that entering a burst mode since the three-level power factor rectifier operates in a light-load condition, and the burst mode comprises a burst period and a burst sleep period; turning on the first switch and the second switch in the burst sleep period, and the AC power source in a positive half cycle and a voltage value of the AC power source is greater than a first threshold; turning on the third switch and the fourth switch in the burst sleep period, and the AC power source in a negative half cycle and the voltage value of the AC power source is less than a second threshold; turning on the second switch and the third switch for a specific time period when entering the burst period from the burst sleep period.

The main purpose and effect of this disclosure mainly focuses on the specific switch operation method when the three-level power factor rectifier operates in the burst mode, the input inductor remains in a demagnetized state during the burst mode to prevent the voltages at both ends of the switches from exceeding the upper limit of the preset specification. Therefore, the switch components with appropriate rated specifications can be selected as the switches, thereby reducing the construction cost of the three-level power factor rectifier.

It is to be understood that both the foregoing general description and the following detailed description are exemplary, and are intended to provide further explanation of the present disclosure as claimed. Other advantages and features of the present disclosure will be apparent from the following description, drawings, and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Figure 1:
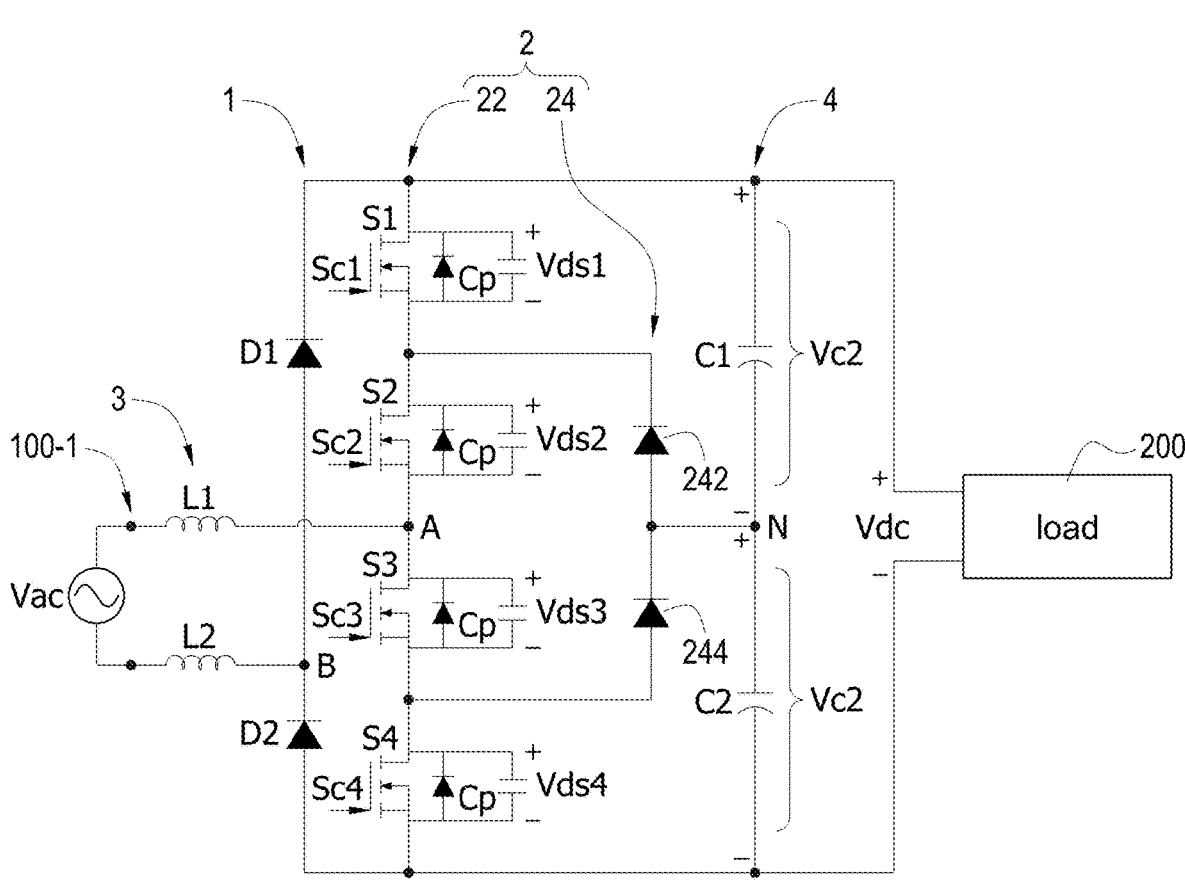
FIG. 1 is a block circuit diagram of a three-level power factor rectifier with reduced voltage stress according to the present disclosure.
Figure 1:
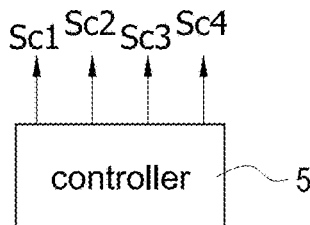

Reference will now be made to the drawing figures to describe the present disclosure in detail. It will be understood that the drawing figures and exemplified embodiments of present disclosure are not limited to the details thereof.

Please refer to FIG. 1, which shows a block circuit diagram of a three-level power factor rectifier with reduced voltage stress according to the present disclosure. The three-level power factor rectifier 100 receives an AC (alternating current) power source Vac, and is coupled to a load or a rear-stage conversion circuit (hereinafter referred to as a load 200), and provides a DC (direct current) power source Vdc to supply power to the load 200. The three-level power factor rectifier 100 includes a diode bridge arm 1, a bridge arm assembly 2, input inductor 3, a capacitor bank 4, and a controller 5. The bridge arm assembly 2 includes a first bridge arm 22 and a second bridge arm 24. The diode bridge arm 1 includes a first diode D1 and a second diode D2 connected in series. The diode bridge arm 1 is connected to the first bridge arm 22 of the bridge arm assembly 2 and the capacitor bank 4 in parallel. In particular, the first diode D1 and the second diode D2 may be replaced by active switches (such as but not limited to, transistors), and the controller 5 is used to control turning on and turning off the active switches (transistors).

The first bridge arm 22 includes a first switch S1, a second switch S2, a third switch S3, and a fourth switch S4 connected in series and in sequence. The second bridge arm 24 includes a first freewheeling component 242 and a second freewheeling component 244 connected in series and in sequence. A first terminal of the first freewheeling component 242 is coupled to a node between the first switch S1 and the second switch S2, a second terminal of the first freewheeling component 242 is coupled to a first terminal of the second freewheeling component 244, and a second terminal of the second freewheeling component 244 is coupled to a node between the third switch S3 and the fourth switch S4 so as to form a circuit structure in which the second bridge arm 24 is connected to the second switch S2 and the third switch S3 in parallel. In particular, the first freewheeling component 242 and the second freewheeling component 244 may be passive diodes, or active switches (for example but not limited to, transistors) controlled by the controller 5 to be turned on and turned off.

A first terminal of the input inductor 3 is coupled to an input terminal 100-1 of the three-level power factor rectifier 100 and receives the AC power source Vac through the input terminal 100-1. A second terminal of the input inductor 3 is coupled to a first node A between the second switch S2 and the third switch S3, and a third terminal of the input inductor 3 is coupled to a second node B between the first diode D1 and the second diode D2. Specifically, the input inductor 3 includes a first inductor L1 and a second inductor L2. The first inductor L1 is coupled between the input terminal 100-1 and the first node A, and the second inductor L2 is coupled between the input terminal 100-1 and the second node B. In particular, the input inductor 3 may only include any one of the first inductor L1 and the second inductor L2, and is not limited to the two shown in FIG. 1.

The capacitor bank 4 may be coupled to the load 200 through a DC link, and the capacitor bank 4 includes a first capacitor C1 and a second capacitor C2 connected in series and in sequence. A midpoint N between the first capacitor C1 and the second capacitor C2 is coupled to a node between the first freewheeling component 242 and the second freewheeling component 244, so that the midpoint N forms a midpoint potential terminal of the capacitor bank 4. The controller 5 is coupled to the first bridge arm 22, and respectively provides control signals Sc1-Sc4 to the switches S1-S4 so as to control the three-level power factor rectifier 100 to convert the AC power source Vac into a DC power source Vdc by controlling the first bridge arm 22. In the present disclosure, the controller 5 has at least two operation modes. When a loading of the load 200 is greater than a load threshold (for example, more than 3.5% of the rated full load value), the controller 5 controls the three-level power factor rectifier 100 in a normal mode. When the loading of the load 200 is less than the load threshold (for example, less than 3.5% of the rated full load value, that is, a light-load condition or a no-load condition), the controller 5 controls the three-level power factor rectifier 100 in a burst mode. In particular, the burst mode includes a burst period and a burst sleep period. In the burst period, the controller 5 provides control signals Sc1 to Sc4 to control the switches S1-S4 to maintain the energy of the first capacitor C1 and the second capacitor C2 and maintain and stabilize the voltage of the DC power source Vdc. On the contrary, in the burst sleep period, the controller 5 may not provide the control signals Sc1 to Sc4 to control the switches S1-S4, so as to reduce the power consumption of the three-level power factor rectifier 100 due to sleep (or standby).

Figure 2A:
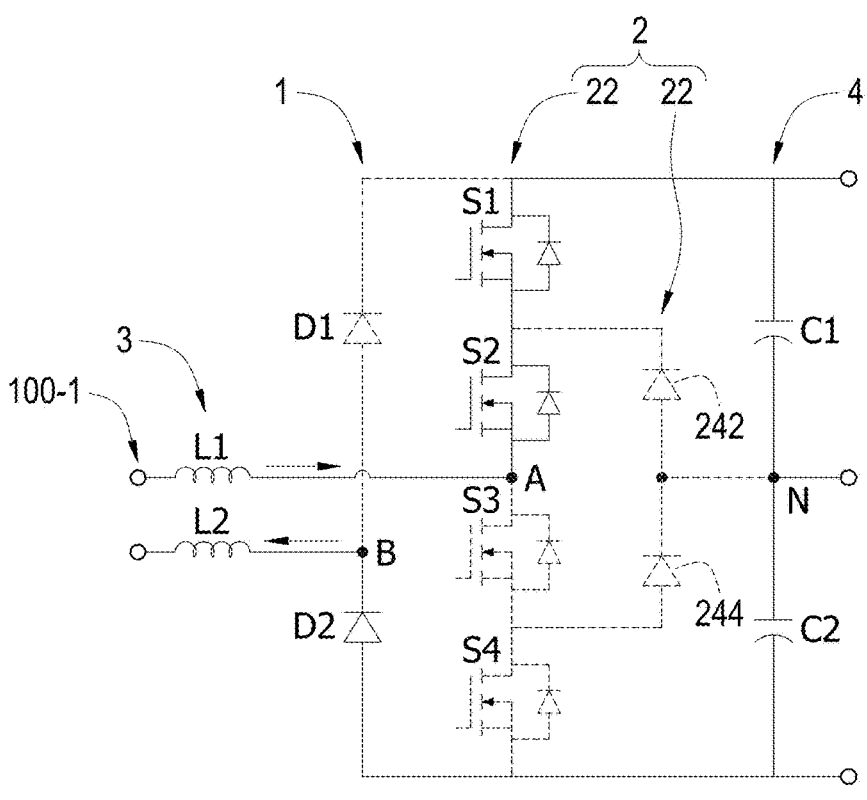
FIG. 2A to FIG. 2F are schematic diagrams of the three-level power factor rectifier in various operation modes according to the present disclosure.
Figure 2B:
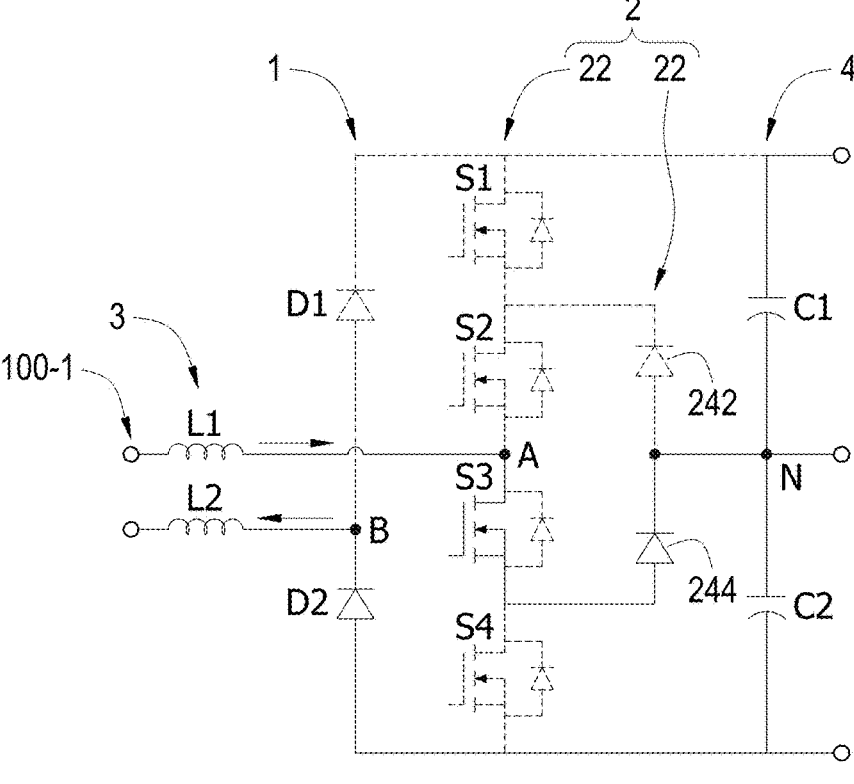
Figure 2C:
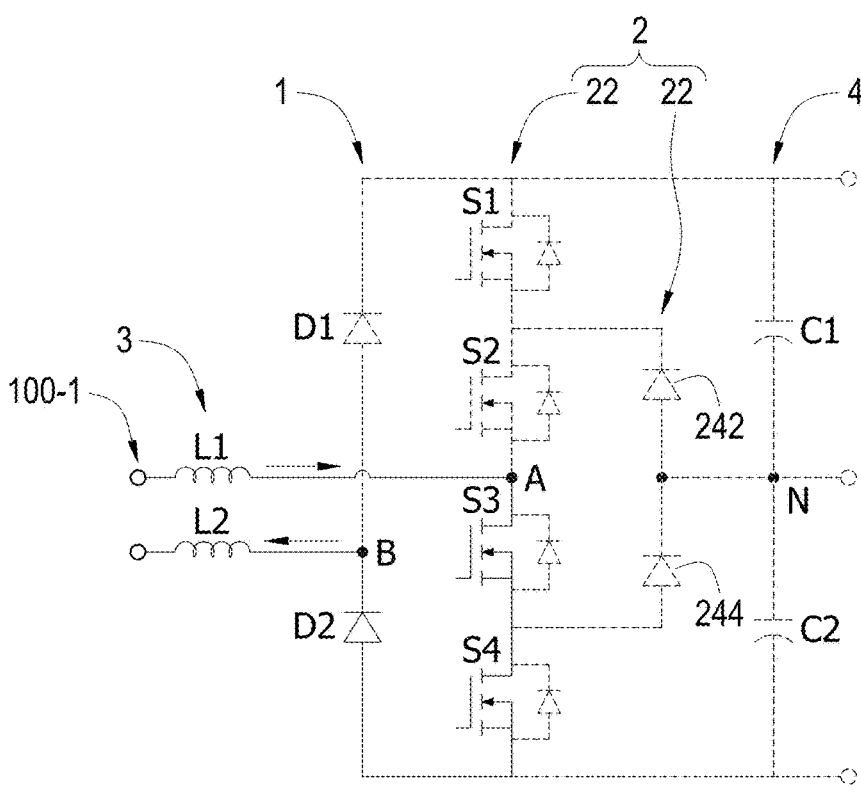

Please refer to FIG. 2A to FIG. 2F, which show schematic diagrams of the three-level power factor rectifier in various operation modes according to the present disclosure, and also refer to FIG. 1. The three-level power factor rectifier 100 provides six operation modes by turning on and turning off the switches S1-S4 by the controller 5 as shown in FIG. 2A to FIG. 2F. When the AC power source Vac is in the positive half cycle, the input current flows into the first node A of the three-level power factor rectifier 100 and flows out from the second node B. In this condition, the second diode D2 is forward biased, and the input current is in the positive direction. As shown in FIG. 2A, the three-level power factor rectifier 100 operates in "+2 mode". In this condition, the input current flows through the first switch S1, the second switch S2, the first capacitor C1 and the second capacitor C2 of the capacitor bank 4, and the second diode D2. Also, the voltage Vab between the first node A and the second node B of the three-level power factor rectifier 100 is the first capacitor voltage Vc1 of the first capacitor C1 plus the second capacitor voltage Vc2 of the second capacitor C2. As shown in FIG. 2B, the three-level power factor rectifier 100 operates in "+1 mode". In this condition, the input current flows through the third switch S3, the second freewheeling component 244, the second capacitor C2, and the second diode D2. Also, the voltage Vab between the first node A and the second node B is the second capacitor voltage Vc2. As shown in FIG. 2C, the three-level power factor rectifier 100 operates in "+0 mode". In this condition, the input current flows through the third switch S3, the fourth switch S4, and the second diode D2. Also, the voltage Vab between the first node A and the second node B is zero, and the current direction is positive.

Figure 2D:
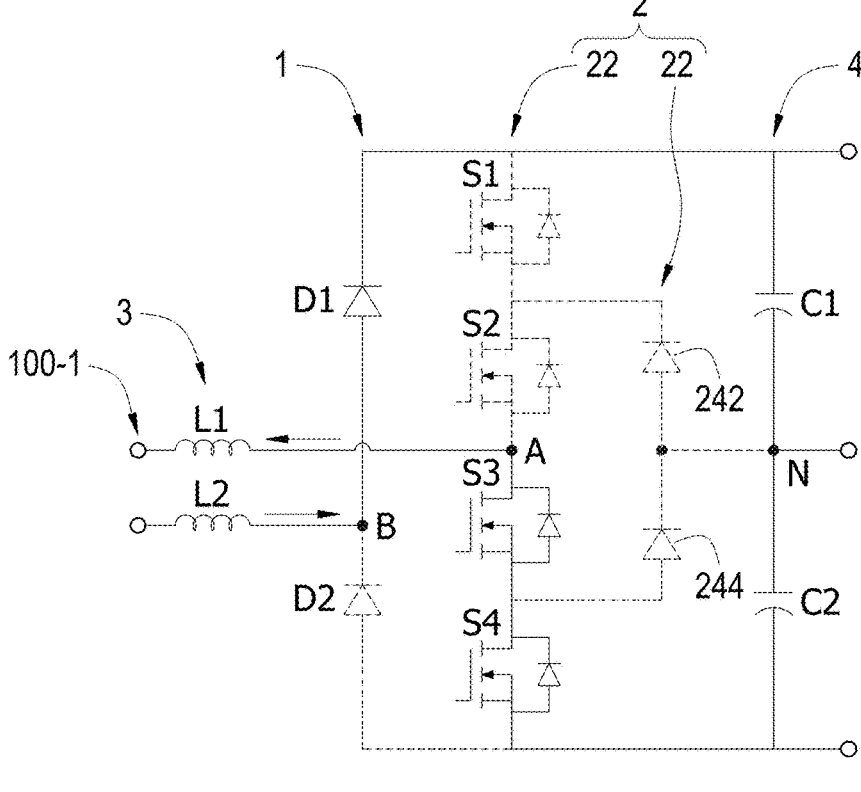
Figure 2E:
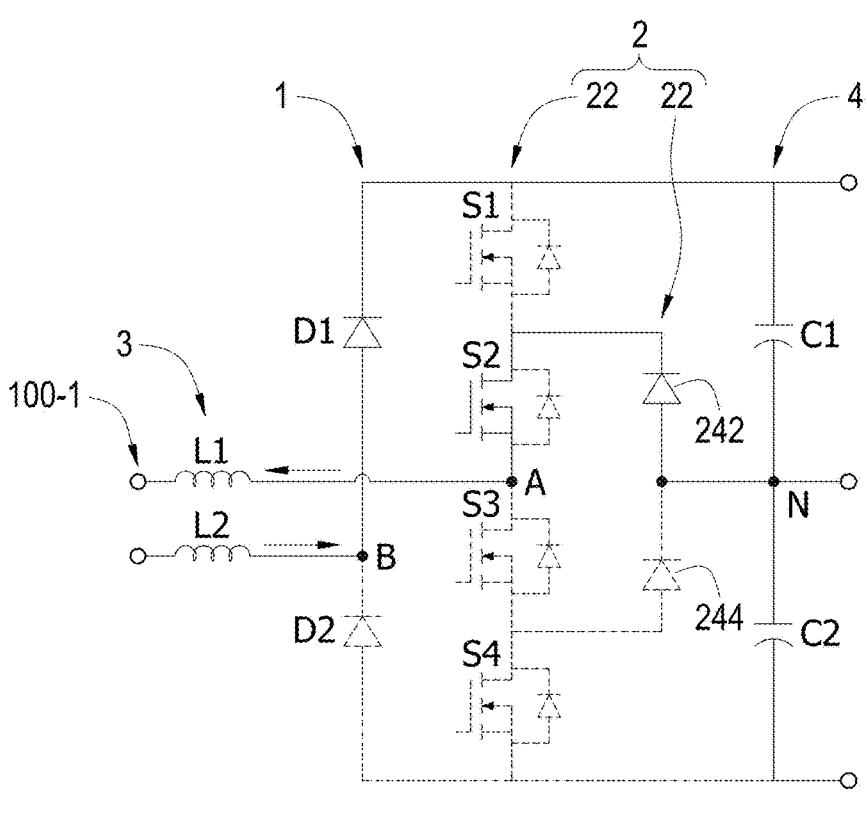
Figure 2F:
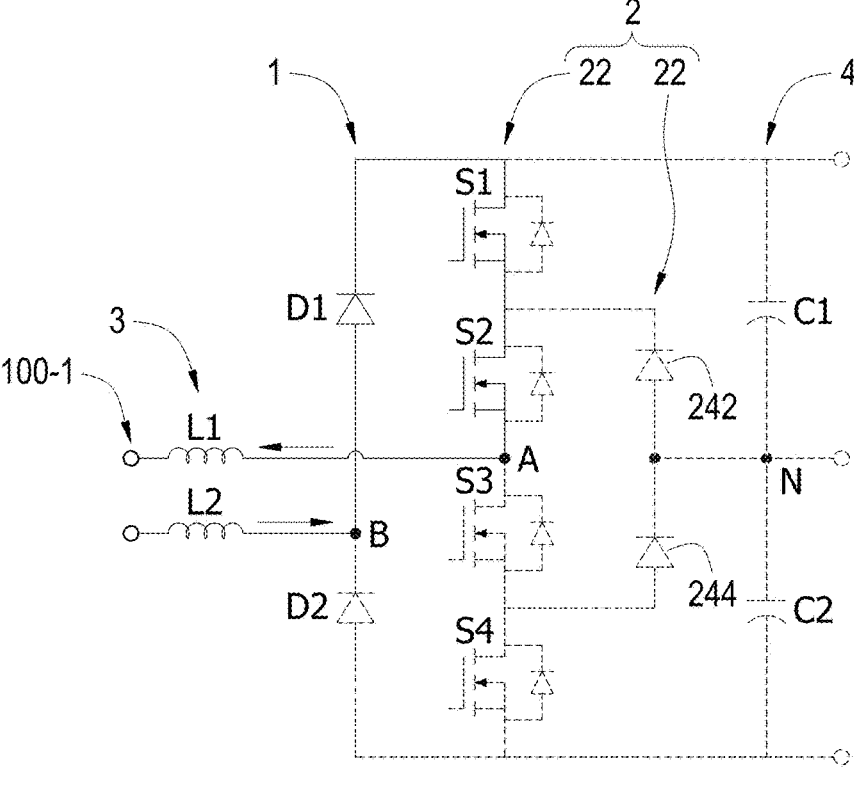

When the AC power source Vac is in the negative half cycle, the input current flows into the second node B and flows out from the first node A. In this condition, the first diode D1 is forward biased, and the input current is in the negative direction. As shown in FIG. 2D, the three-level power factor rectifier 100 operates in "−2 mode". In this condition, the input current flows through the first diode D1, the first capacitor C1, the second capacitor C2, the third switch S3, and the fourth switch S4. Also, the voltage Vab between the first node A and the second node B is the negative first capacitor voltage Vc1 minus the second capacitor voltage Vc2. As shown in FIG. 2E, the three-level power factor rectifier 100 operates in "−1 mode". In this condition, the input current flows through the first diode D1, the first capacitor C1, the first freewheeling component 242, and the second switch S2. Also, the voltage Vab between the first node A and the second node B is the negative first capacitor voltage Vc1. As shown in FIG. 2F, the three-level power factor rectifier 100 operates in "−0 mode". In this condition, the input current flows through the first diode D1, the first switch S1, and the second switch S2. Also, the voltage Vab between the first node A and the second node B is zero, and the current direction is negative.

Figure 3A:
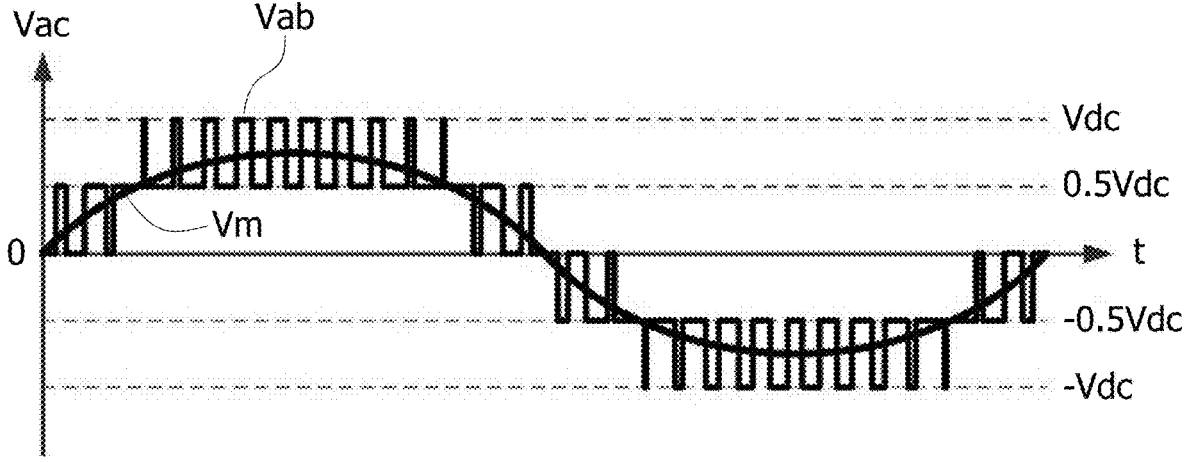
FIG. 3A is a schematic waveform of the three-level power factor rectifier operating a normal mode according to a first embodiment of the present disclosure.
Figure 3B:
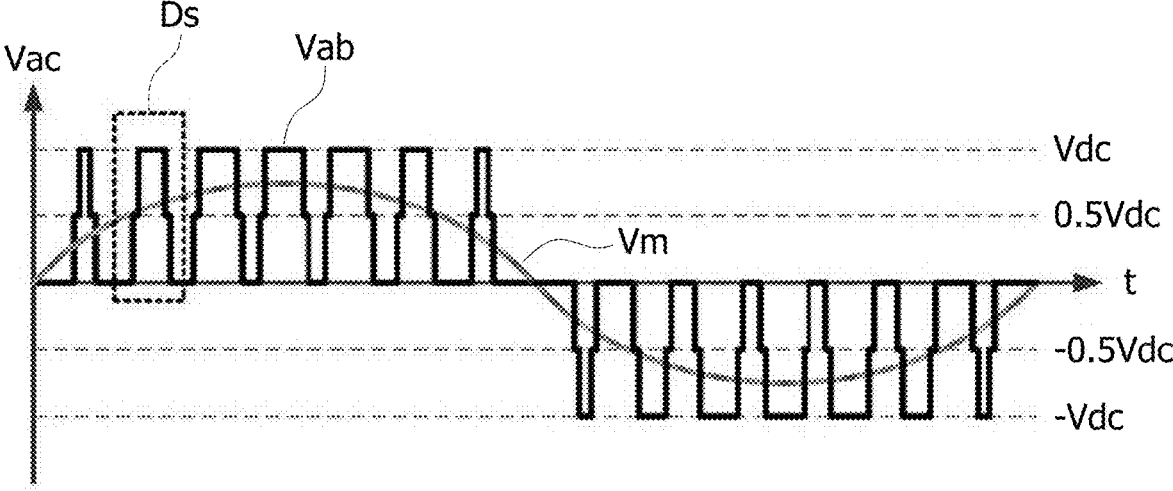
FIG. 3B is a schematic waveform of the three-level power factor rectifier operating the normal mode according to a second embodiment of the present disclosure.

Please refer to FIG. 3A, which shows a schematic waveform of the three-level power factor rectifier operating a normal mode according to a first embodiment of the present disclosure, please refer to FIG. 3B, which shows a schematic waveform of the three-level power factor rectifier operating the normal mode according to a second embodiment of the present disclosure, and also refer to FIG. 1 to FIG. 2F. In FIG. 3A and FIG. 3B, in combination with the various modes described in FIG. 2A to FIG. 2F, by controlling the duration time of the three-level power factor rectifier 100 in each mode, the voltage Vab between the first node A and the second node B is fitted to a sinusoidal curve of the input power source Vac. In FIG. 3A, it is assumed that the first capacitor voltage Vc1 and the second capacitor voltage Vc2 are equal, both are 0.5 Vdc (Vdc is the output power source). When the input power source Vac is in the positive half cycle and the voltage Vab is between 0.5 Vdc and Vdc, the controller 5 controls the three-level power factor rectifier 100 to switch back and forth between the "+1 mode" and the "+2 mode" according to the voltage value Vm of the AC power source Vac. Also, in the "+1 mode" and "+2 mode", modulation is performed by adjusting the duty cycles of the control signals Sc1 to Sc4. When the input power source Vac is in the positive half cycle and the voltage Vab is between 0 and 0.5 Vdc, the controller 5 controls the three-level power factor rectifier 100 to switch back and forth between the "+1 mode" and the "+0 mode" according to the voltage value Vm of the AC power source Vac. Also, in the "+1 mode" and "+0 mode", modulation is performed by adjusting the duty cycles of the control signals Sc1 to Sc4. In particular, the above-mentioned operations from the "+2 mode" to the "+0 mode" are operations when the input power source Vac is in a positive half cycle.

On the contrary, when the input power source Vac is in the negative half cycle and the voltage Vab is between –0.5 Vdc and –Vdc, the controller 5 controls the three-level power factor rectifier 100 to switch back and forth between the "–1 mode" and the "–2 mode" according to the voltage value Vm of the AC power source Vac. Also, in the "–1 mode" and "–2 mode", modulation is performed by adjusting the duty cycles of the control signals Sc1 to Sc4. When the input power source Vac is in the negative half cycle and the voltage Vab is between 0 and –0.5 Vdc, the controller 5 controls the three-level power factor rectifier 100 to switch back and forth between the "–1 mode" and the "–0 mode" according to the voltage value Vm of the AC power source Vac. Also, in the "–1 mode" and "–0 mode", modulation is performed by adjusting the duty cycles of the control signals Sc1 to Sc4. In particular, the above-mentioned operations from the "–2 mode" to the "–0 mode" are operations when the input power source Vac is in a negative half cycle.

In FIG. 3A, the voltage Vab is boosted (stepped up) from –Vdc to –0, or from 0 to Vdc is referred to as the step-up operation, and the voltage Vab is bucked (stepped down) from Vdc to 0, or from 0 to –Vd is referred to as the step-down operation. When the voltage value Vm of the AC power source Vac is in the positive half cycle or in the negative half cycle, the controller controls the switches S1-S4 according to the changes in each mode, so that the voltage Vab is repeatedly stepped up or stepped down. Therefore, the three-level power factor rectifier 100 is controlled to convert the AC power source Vac into the DC power source Vdc, and correct its power factor.

FIG. 3B is similar to FIG. 3A, that is, the modulation strategy is mainly to reduce the current flowing into or out from the midpoint N by shortening the duration time of the +1 mode and the –1 mode. When the input power source Vac is in the positive half cycle and the voltage Vab is between 0 and Vdc (Vdc is the output power source), within each switching cycle Ds (i.e., each waveform roughly equal to a square wave), the controller 5 controls the three-level power factor rectifier 100 to switch between the +2 mode and the +0 mode via the +1 mode briefly to perform modulation, that is, the three-level power factor rectifier 100 is in a state of transition to the +1 mode only for a short time period. Similarly, when the input power source Vac is in the negative half cycle and the voltage Vab is between –0 and –Vdc, within each switching cycle Ds, the controller 5 controls the three-level power factor rectifier 100 to switch between the –2 mode and the –0 mode via the –1 mode briefly to perform modulation, that is, the three-level power factor rectifier 100 is in a state of transition to the –1 mode only for a short time period.

In each switching period Ds, since the three-level power factor rectifier 100 switches between the +0 mode and the +2 mode, or switches between the –0 mode and –2 mode, and the operation time of the +1 mode and the –1 mode as the transition mode is very short. Therefore, the current flowing into or out from the midpoint N is smaller, which can reduce the voltage fluctuation at the midpoint N. Furthermore, the current flowing through the first freewheeling component 242 and the second freewheeling component 244 is also smaller, which can reduce the specifications and cost of the components.

Figure 4:
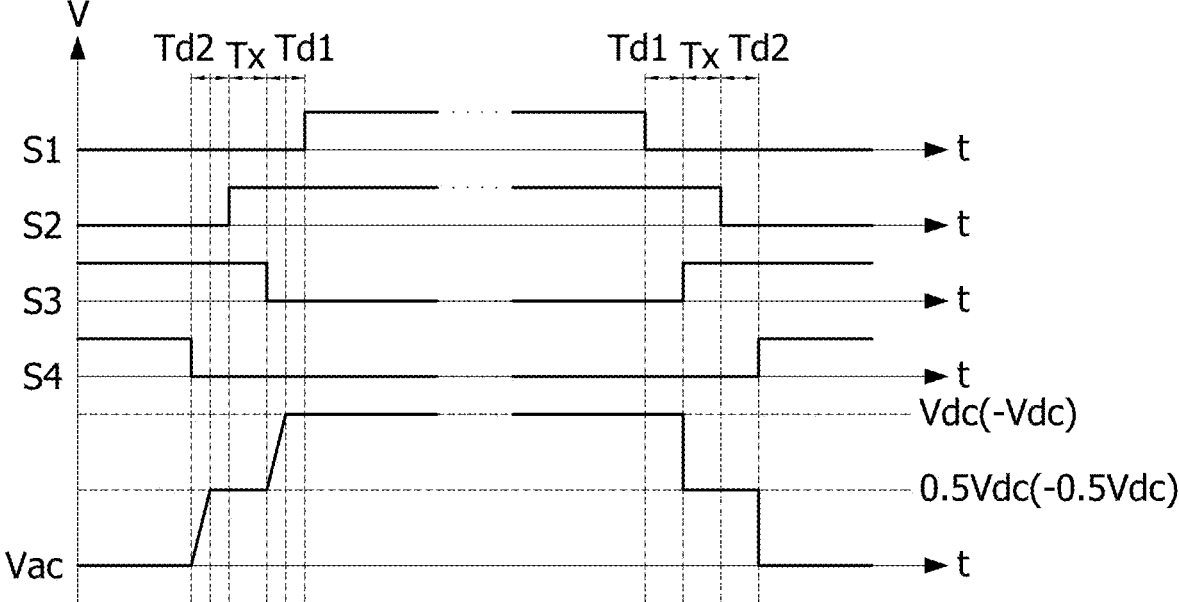
FIG. 4 is a switching timing diagram of the three-level power factor rectifier operating in a normal mode within a switching cycle according to the present disclosure.

Please refer to FIG. 4, which shows a switching timing diagram of the three-level power factor rectifier operating in a normal mode within a switching cycle according to the present disclosure, and also refer to FIG. 1 to FIG. 3B. As shown in FIG. 4, the first switch S1 and the third switch S3 are complementary, and the controller 5 sets a first dead time Td1 under the transition (i.e., from turning on to turning off or from turning off to turning on) of the first switch S1 and the transition of the third switch S3. Similarly, the second switch S2 and the fourth switch S4 are complementary, and the controller 5 sets a second dead time Td2 under the transition of the second switch S2 and the transition of the fourth switch S4, thereby avoid having more than one current path at the same time. As shown in FIG. 3B, the process in which the voltage Vab between the first node A and the second node B switches from 0 to Vdc corresponds to the process in which the three-level power factor rectifier 100 shown in FIG. 3B switches from the +0 mode to the +2 mode (the input current is in the positive direction) or from the –2 mode to the –0 mode (the input current is in the negative direction), and both of these are the step-up operation to the voltage Vab. In the step-up operation within one switching cycle Ds in FIG. 4, the controller 5 first turns off the fourth switch S4, and then turns on the second switch S2, and then turns off the third switch S3, and finally turns on the first switch S1. In particular, an overlap time when the second switch S2 and the third switch S3 are turned on at the same time is Tx.

Similarly, the process in which the voltage Vab between the first node A and the second node B switches from Vdc to 0 corresponds to the process in which the three-level power factor rectifier 100 shown in FIG. 3B switches from the +2 mode to the +0 mode (the input current is in the positive direction) or from the –0 mode to the –2 mode (the input current is in the negative direction), and both of these are the step-down operation to the voltage Vab. In the step-down operation within one switching cycle Ds in FIG. 4, the controller 5 first turns off the first switch S1, and then turns on the third switch S3, and then turns off the second switch S2, and finally turns on the fourth switch S4.

Figure 5:
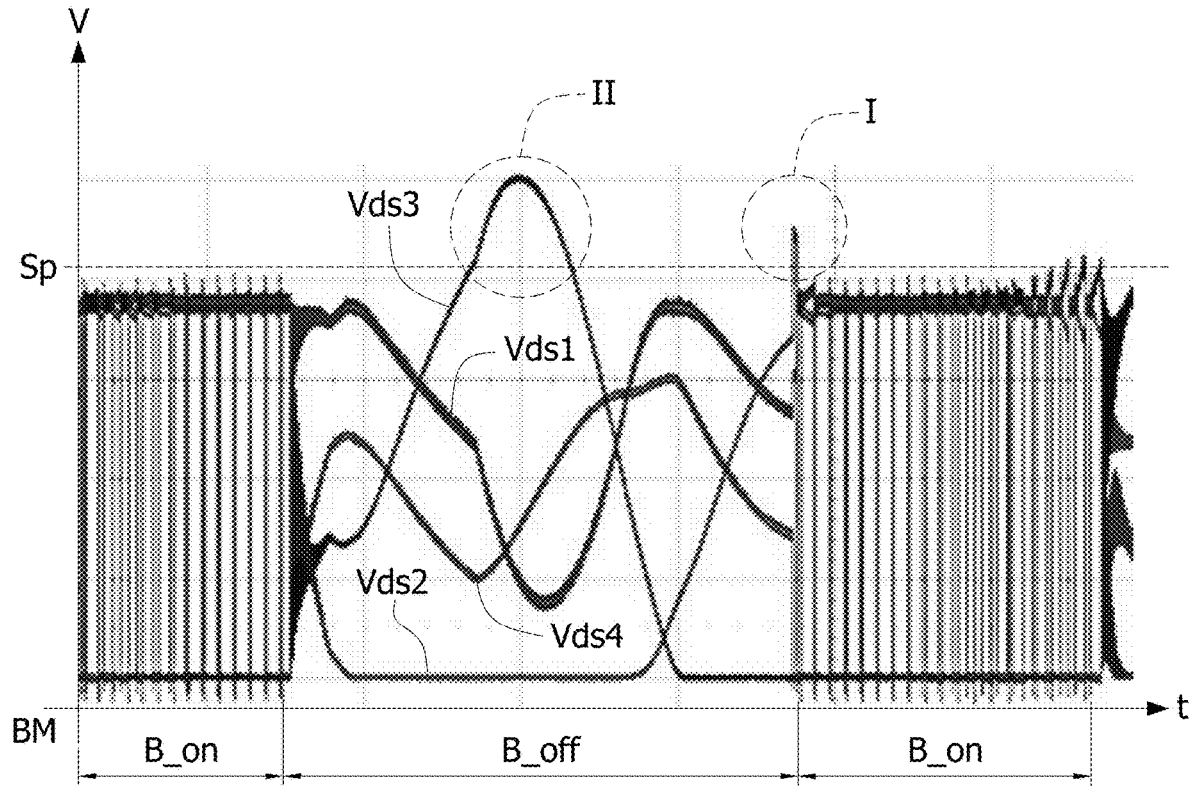
FIG. 5 is a switching waveform diagram of the three-level power factor rectifier operating in a burst mode without using a specific switching operation method according to the present disclosure.

Please refer to FIG. 5, which shows a switching waveform diagram of the three-level power factor rectifier operating in a burst mode without using a specific switching operation method according to the present disclosure, and also refer to FIG. 1 to FIG. 4. Since the switches S1-S4 are not ideal switching components, they all have parasitic capacitance Cp (such as but not limited to Ciss, Coss, etc., which are omitted and not shown in FIG. 2A to FIG. 2F). Therefore, when the three-level power factor rectifier 100 operates in the burst period B_on or the burst sleep period B_off of the burst mode BM, due to the influence of the parasitic capacitance Cp, the voltages Vds1-Vds4 across some switches S1-S4 will exceed an upper limit of a preset specification SP (for example, but not limited to, 960V). In particular, the reason why the voltages Vds1-Vds4 at both ends of some switches S1-S4 exceed the upper limit of the preset specification SP is that: when the three-level power factor rectifier 100 operates in the burst mode BM, since the output terminal does not require too much energy under the light-load condition, the energy stored by the input inductor 3 is not completely provided to the capacitor bank 4, and therefore the input inductor 3 has not been completely demagnetized. Therefore, when the three-level power factor rectifier 100 enters the burst period B_on from the burst sleep period B_off, due to the instantaneous transient state when some switches S1-S4 are turned on, the parasitic capacitance Cp is charged, thereby causing the voltages Vds1-Vds4 across some switches S1-S4 to be temporarily raised to exceed the upper limit of the preset specification SP (as shown in the dotted box I).

On the other hand, when the three-level power factor rectifier 100 is in the burst sleep period B_off, since the input inductor 3 does not provide the direction of the demagnetization path by controlling the switch by the controller 5, energy can flow naturally according to the voltage of the interaction between the AC power source Vac and the DC power source Vdc, thereby causing the energy in the parasitic capacitance Cp to also flow naturally. Therefore, the voltages Vds1-Vds4 at both ends of some switches S1-S4 may be thrown beyond the upper limit of the preset specification SP (as shown in the dotted box II) through natural voltage equalization. Accordingly, the main purpose and effect of the present disclosure is that when the three-level power factor rectifier 100 operates in the burst mode BM, the input inductor 3 remains in a demagnetized state during the burst mode BM to prevent the voltages Vds1-Vds4 at both ends of the switches S1-S4 from exceeding the upper limit of the preset specification SP according to the specific switch operation method disclosed in this disclosure. Therefore, the switch components with appropriate rated specifications can be selected as the switches S1-S4, thereby reducing the construction cost of the three-level power factor rectifier 100.

Figure 6A:
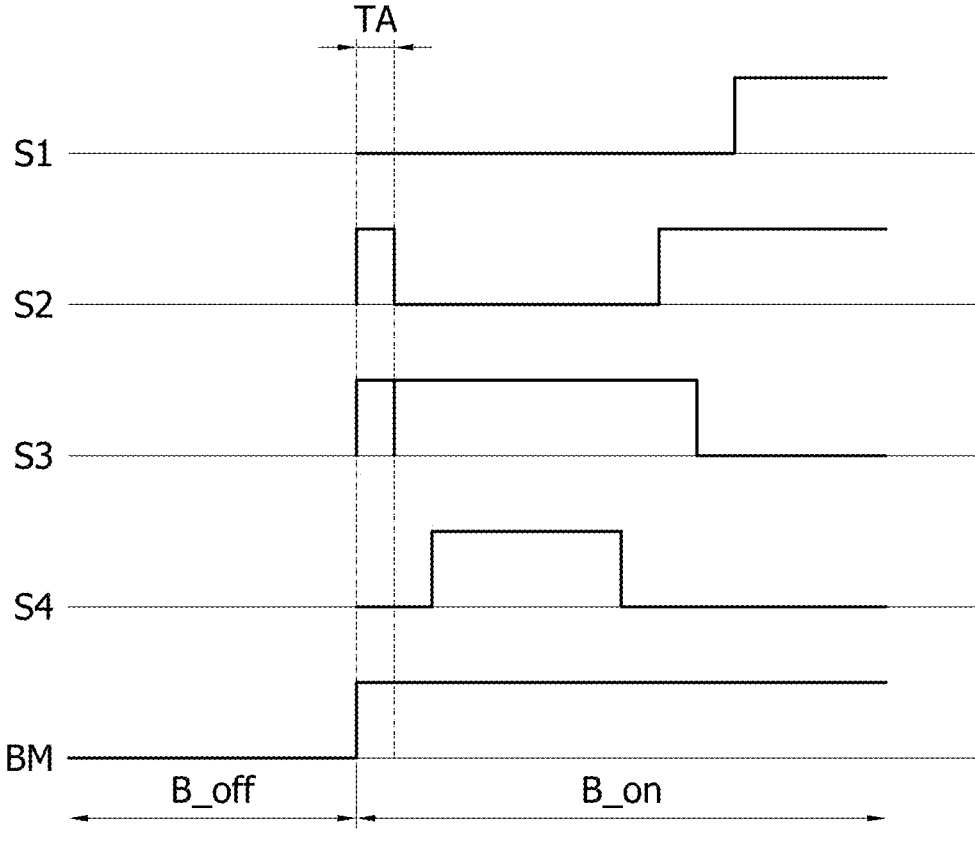
FIG. 6A is a switching timing diagram of the three-level power factor rectifier operating in the burst mode and entering the burst period from a burst sleep period according to the present disclosure.

Please refer to FIG. 6A, which shows a switching timing diagram of the three-level power factor rectifier operating in the burst mode and entering the burst period from a burst sleep period according to the present disclosure, and also refer to FIG. 1 to FIG. 5. When the controller 5 realizes that the loading of the load 200 is less than the load threshold through, for example, but not limited to, the output current of the three-level power factor rectifier 100, the controller 5 controls the first bridge arm 22 operating in the burst mode BM under the light-load condition, and the burst mode BM includes a burst period B_on and a burst sleep period B_off. In the burst mode BM, the controller 5 usually sets an upper limit voltage value and lower limit voltage value of the DC power source Vdc. When the controller 5 determines that the DC power source Vdc on a DC link is still sufficient (that is, it has not dropped to the preset voltage value), the controller 5 controls the first bridge arm 22 operating in the burst sleep period B_off, and the voltage value of the DC power source Vdc gradually decreases. Since the loading of the load 200 is lower than a load threshold, the voltage value of the DC power source Vdc decreases slowly, so that a hold-up time under the burst sleep period B_off can generally be much longer than that under the burst period B_on. On the contrary, when the controller 5 determines that the DC power source Vdc on the DC link is insufficient (that is, it has dropped to the preset voltage value), the controller 5 controls the first bridge arm 22 operating in the burst period B_on, and a first capacitor C1 and a second capacitor C2 are charged. When the first capacitor C1 and the second capacitor C2 are charged until the voltage value of the DC power source Vdc reaches the upper limit voltage value, the operation period is changed from the burst period B_on to the burst sleep period B_off.

When the operation period changes from the burst sleep period B_off to the burst period B_on, the controller 5 turns on the second switch S2 and the third switch S3 for a specific time period TA. Therefore, when entering the burst period B_on, a discharge path from the input inductor 3 to the capacitor bank 4, that is, a demagnetization path of releasing the energy of the input inductor 3 to the capacitor bank 4, can maintain the demagnetized state of the input inductor 3.

Therefore, when the specific time period TA ends, the controller 5 controls the switching of the first bridge arm 22 to cause the voltage Vab between the first node A and the second node B to change as shown in FIG. 3A and FIG. 3B. Therefore, the voltages Vds1-Vds4 at both ends of the switches S1-S4 will not produce high pulse waves as shown in the dotted box I in FIG. 5, thereby preventing the voltage Vds1-Vds4 at both ends of switches S1-S4 from exceeding the upper limit of the preset specification SP. In particular, during the specific time period TA, the controller 5 turns off the first switch S1 and the fourth switch S4, and turns on the second switch S2 and the third switch S3 to prevent the three-level power factor rectifier 100 from generating additional current paths.

Furthermore, when entering the burst period B_on and after the specific time period TA ends, the controller 5 can operate the first bridge arm 22 in the step-up operation and the step-down operation in FIG. 3A and FIG. 3B when the AC power source Vac is in the positive half cycle or the negative half cycle. The switching timing of the step-up operation and the step-down operation may be seen in FIG. 4, and after the specific time period TA ends, the step-down operation is entered/performed. Within a switching cycle Ds, the controller 5 simultaneously turns off the first switch S1 and the second switch S2, keeps turning on the third switch S3, and finally turns on the fourth switch S4. Afterward, the step-up operation immediately follows within the same switching cycle Ds, the controller 5 first turns off the fourth switch S4, and then turns on the second switch S2, and then turns off the third switch S3, and finally turns on the first switch S1.

Figure 6B:
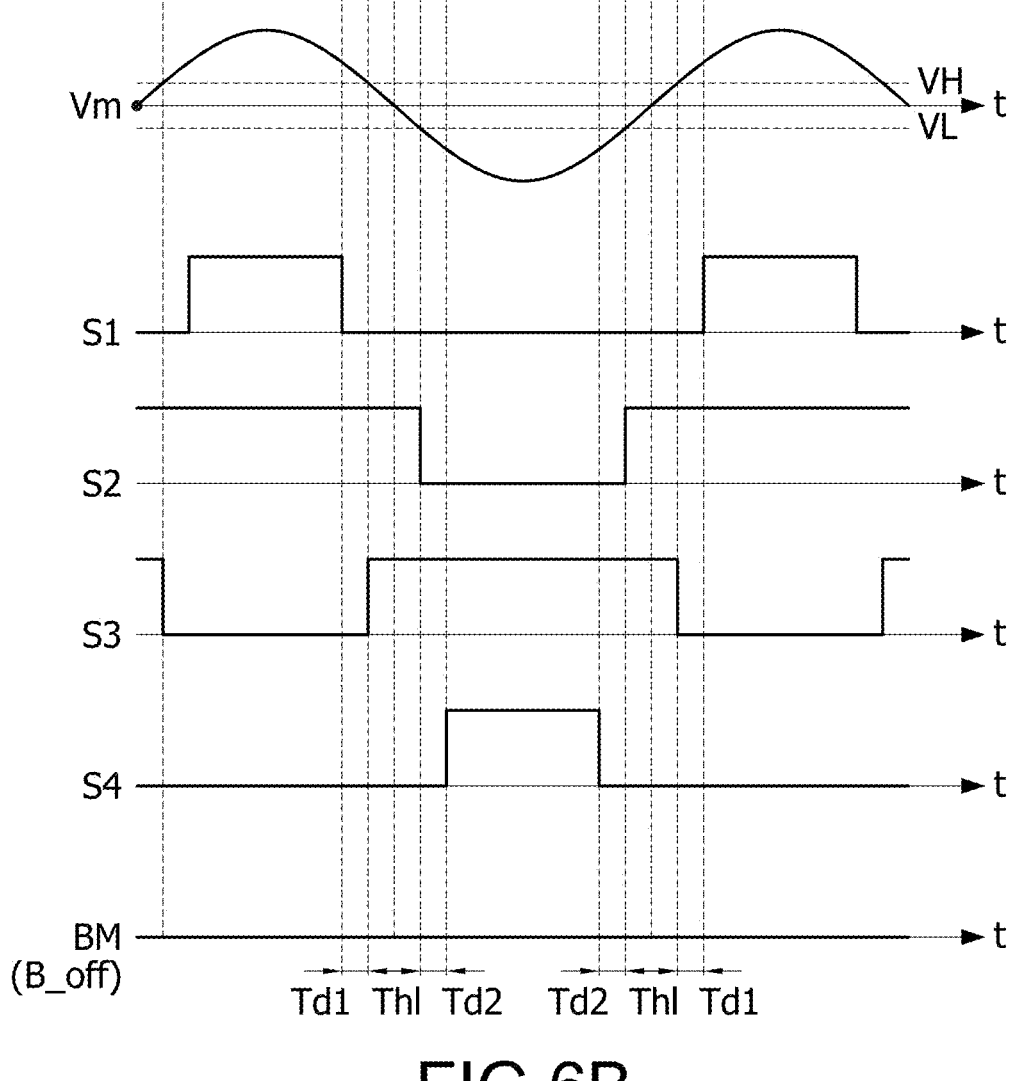
FIG. 6B is a switching timing diagram of the three-level power factor rectifier operating in burst mode and in the burst sleep period according to the present disclosure.

Please refer to FIG. 6B, which shows a switching timing diagram of the three-level power factor rectifier operating in burst mode and in the burst sleep period according to the present disclosure, and also refer to FIG. 1 to FIG. 6A. In the burst sleep period B_off, the controller can mainly control the switches S1-S4 to be turned on and turned off through a low frequency (such as but not limited, to twice the mains frequency) to provide different current paths in different time periods. Therefore, the energy of the input inductor 3 or the capacitor bank 4 can flow through these different current paths and the input inductor 3 does not provide the direction of the demagnetization path by controlling the switch by the controller 5, thereby preventing the phenomenon of natural voltage equalization caused by parasitic capacitance Cp to occur the situation shown in the dotted box II in FIG. 5. Specifically, in the burst sleep period B_off, when the AC power source Vac is in the positive half cycle and the voltage value Vm of the AC power source Vac is greater than the first threshold VH, the controller 5 turns on the first switch S1 and the second switch S2 to provide a current path as shown in FIG. 2A. In the burst sleep period B_off, when the AC power source Vac is in the negative half cycle and the voltage value Vm of the AC power source Vac is less than the second threshold VL, the controller 5 turns on the third switch S3 and the fourth switch S4 to provide a current path as shown in FIG. 2D. Therefore, in the burst sleep period B_off, a demagnetization path from the input inductor 3 to the capacitor bank 4 can be formed as shown in FIG. 2A and FIG. 2D to maintain the demagnetization state of the input inductor 3.

In particular, the first threshold VH set by the controller 5 is greater than the zero-crossing value 0 of the AC power source Vac, and the second threshold VL set by the controller 5 is less than the zero-crossing value 0. In one embodiment, when the controller 5 turns on the first switch S1 and the second switch S2 (that is, when the voltage value Vm is greater than the first threshold VH), the controller 5 may turn off the third switch S3 and the fourth switch S4 to prevent the three-level power factor rectifier 100 from generating additional current paths. Similarly, when the controller 5 turns on the third switch S3 and the fourth switch S4 (that is, when the voltage value Vm is less than the second threshold VL), the controller 5 may turn off the first switch S1 and the second switch S2 to prevent the three-level power factor rectifier 100 from generating additional current paths.

On the other hand, in the burst sleep period B_off, when the voltage value Vm is in a crossover period Th1 between the first threshold VH and the second threshold VL, the controller turns on the second switch S2 and the third switch S3, and turns off the first switch S1 and the fourth switch S4 so as to provide current paths as shown in FIG. 2B and FIG. 2E (different from FIG. 2A and FIG. 2D). Therefore, the controller 5 operates the switch in the first bridge arm 22 during the burst sleep period B_off at an operation frequency that is substantially twice the mains frequency (such as, but not limited to, 120 Hz) to provide different current paths in different time periods. On the contrary, during the burst period B_on or the normal operation mode, the operation frequency at which the controller 5 operates the switch in the first bridge arm 22 is usually much higher than the mains frequency, and its general operation frequency is usually above kilohertz (for example, but not limited to 4 kHz, 16 kHz, etc.). In one embodiment, in the low-frequency operation of the burst sleep period B_off, the controller 5 sets a first dead time Td1 under the transition (i.e., from turning on to turning off or from turning off to turning on) of the first switch S1 and the transition of the third switch S3. Similarly, the controller 5 sets a second dead time Td2 under the transition of the second switch S2 and the transition of the fourth switch S4, thereby avoid having more than one current path at the same time.

Figure 6C:
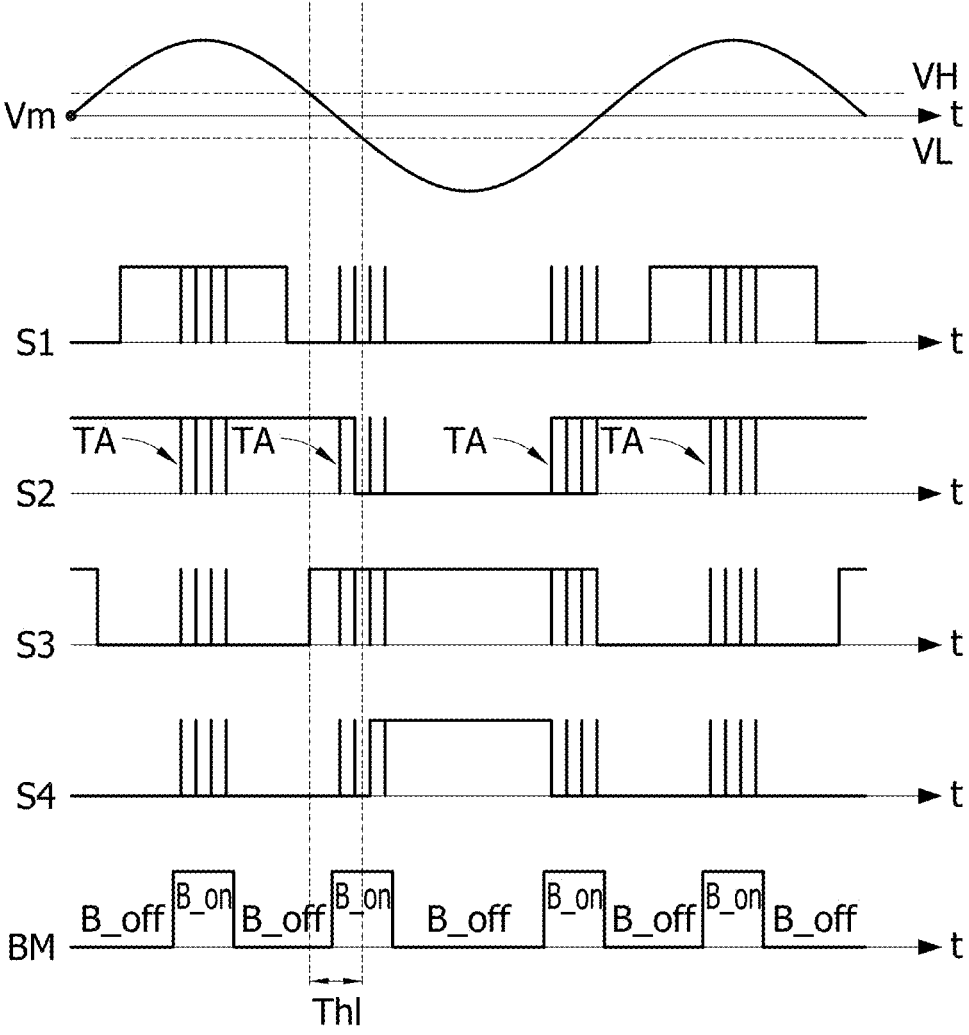
FIG. 6C is a switching timing diagram of the three-level power factor rectifier operating in burst mode according to the present disclosure.

Please refer to FIG. 6C, which shows a switching timing diagram of the three-level power factor rectifier operating in burst mode according to the present disclosure, and also refer to FIG. 1 to FIG. 6B. The waveform of FIG. 6C mainly integrates the burst period B_on of FIG. 6A and the burst sleep period B_off of FIG. 6B. In the operation structure of the switches S1-S4 being turned on and turned off in the burst sleep period B_off shown in FIG. 6B, when the controller 5 determines that the DC power source Vdc on the DC link is insufficient, the controller 5 controls the first bridge arm 22 entering the burst period B_on to maintain the DC power source Vdc. Moreover, after the first bridge arm 22 exits the burst period B_on, the controller 5 still determines how to control the turning on and turning off of the switches S1-S4 based on the voltage value Vm, so that the input inductor 3 remains demagnetized in the burst mode BM according to the specific switch operation method disclosed in FIG. 6C.

Figure 7:
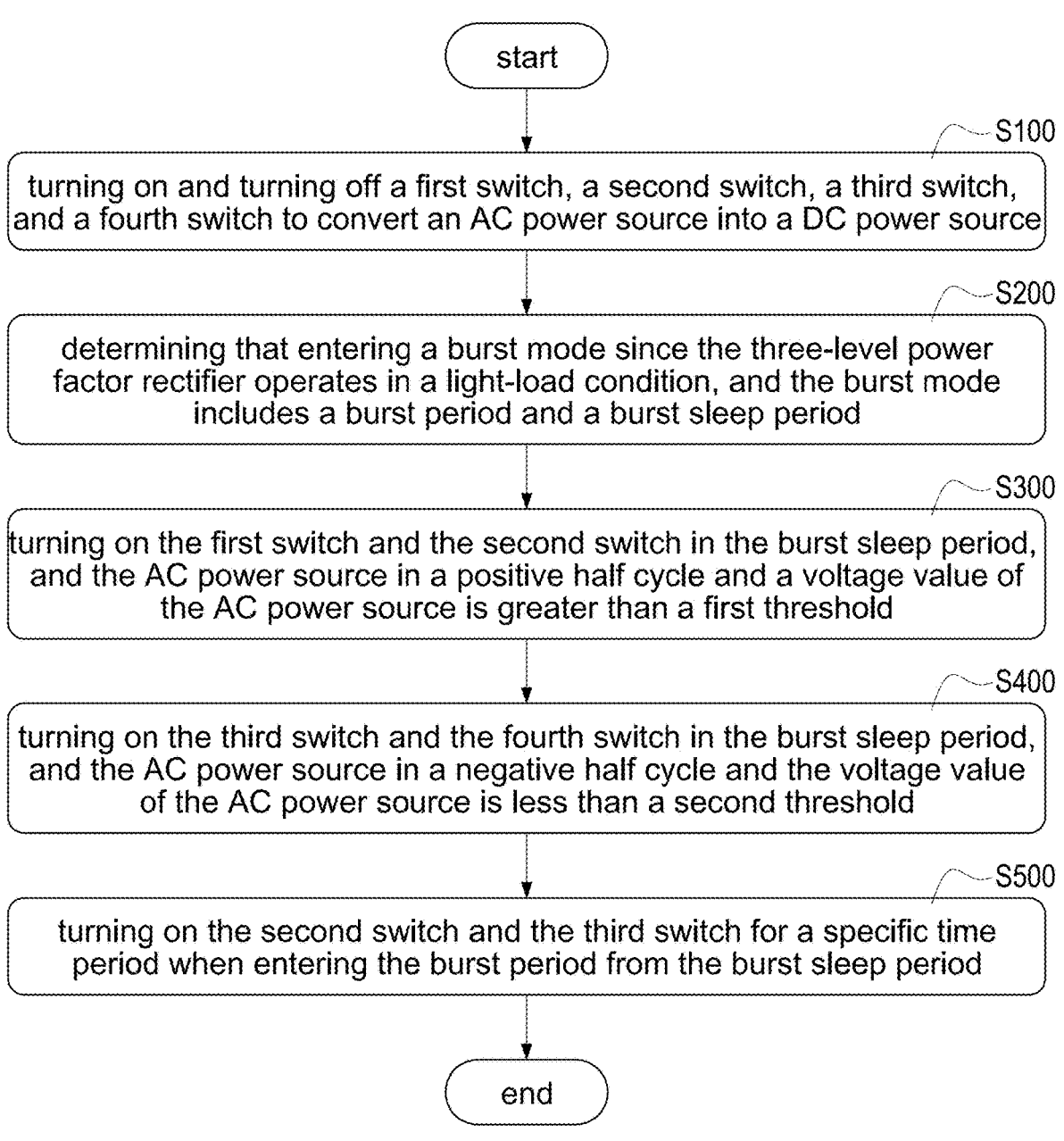
FIG. 7 is a flowchart of a method of operating the three-level power factor rectifier according to the present disclosure.

Please refer to FIG. 7, which. Shows a flowchart of a method of operating the three-level power factor rectifier according to the present disclosure, and also refer to FIG. 1 to FIG. 6C. The present disclosure mainly focuses on the specific switch operation method when the three-level power factor rectifier 100 operates in the burst mode BM, the input inductor 3 remains in a demagnetized state during the burst mode BM to prevent the voltages Vds1-Vds4 at both ends of the switches S1-S4 from exceeding the upper limit of the preset specification SP. Therefore, the method includes steps of: turning on and turning off the first switch, the second switch, the third switch, and the fourth switch to convert the AC power source into the DC power source (S100). The preferred implementation is that the controller 5 respectively provides control signals Sc1-Sc4 to the switches S1-S4 so as to control the three-level power factor rectifier 100 to convert the AC power source Vac into the DC power source Vdc by controlling the first bridge arm 22.

Afterward, determining that entering a burst mode since the three-level power factor rectifier operates in a light-load condition (S200), and the burst mode comprises a burst period and a burst sleep period. In the present disclosure, the controller 5 has at least two operation modes. When a loading of the load 200 is greater than a load threshold, the controller 5 controls the three-level power factor rectifier 100 in a normal mode. When the loading of the load 200 is less than the load threshold, the controller 5 controls the three-level power factor rectifier 100 in a burst mode. In particular, the burst mode includes a burst period and a burst sleep period. When the controller 5 realizes that the loading of the load 200 is less than the load threshold through, for example, but not limited to, the output current of the three-level power factor rectifier 100, the controller 5 controls the first bridge arm 22 operating in the burst mode BM under the light-load condition, and the burst mode BM includes the burst period B_on and the burst sleep period B_off.

Afterward, turning on the first switch and the second switch in the burst sleep period, while the AC power source in a positive half cycle and a voltage value of the AC power source is greater than a first threshold (S300); turning on the third switch and the fourth switch in the burst sleep period, while the AC power source in a negative half cycle and the voltage value of the AC power source is less than a second threshold (S400). In the burst sleep period B_off, the controller 5 can mainly control the switches S1-S4 to be turned on and turned off through a low frequency (such as but not limited, to twice the mains frequency) to provide different current paths in different time periods. Therefore, the energy of the input inductor 3 or the capacitor bank 4 can flow through these different current paths to prevent the input inductor 3 from storing too much energy before it has not been demagnetized, thereby causing the input inductor 3 and the parasitic capacitance Cp to resonate naturally.

Finally, turning on the second switch and the third switch for a specific time period when entering the burst period from the burst sleep period (S500). The preferred implementation is that the controller 5 turns on the second switch S2 and the third switch S3 for a specific time period TA. Therefore, when entering the burst period B_on, a discharge path from the input inductor 3 to the capacitor bank 4, that is, a demagnetization path of releasing the energy of the input inductor 3 to the capacitor bank 4, can maintain the demagnetized state of the input inductor 3. In particular, the detailed operation method of the three-level power factor rectifier 100 not illustrated in FIG. 7 can be referred to FIG. 1 to FIG. 6C, and will not be described again here.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A three-level power factor rectifier, comprising:
   a diode bridge arm comprising a first diode and a second diode connected in series,

a bridge arm assembly connected to the diode bridge arm in parallel, the bridge arm assembly comprising:

a first bridge arm comprising a first switch, a second switch, a third switch, and a fourth switch connected in series and in sequence, and a second bridge arm connected to the second switch and the third switch in parallel, and the second bridge arm comprising a first freewheeling component and a second freewheeling component connected in series and in sequence, an input inductor coupled to a first node between the second switch and the third switch, coupled to a second node between the first diode and the second diode, and coupled to an input terminal that receiving an AC power source, a capacitor bank connected to the bridge arm assembly in parallel, and the capacitor bank comprising a first capacitor and a second capacitor connected in series and in sequence; a midpoint between the first capacitor and the second capacitor coupled to the first freewheeling component and the second freewheeling component, and a controller configured to operate the first bridge arm in a burst mode, and the burst mode comprising a burst period and a burst sleep period, wherein when entering the burst period from the burst sleep period, the controller turns on the second switch and the third switch for a specific time period.

2. The three-level power factor rectifier as claimed in claim 1, wherein in a positive half cycle of the AC power source, the controller performs a step-up operation on a voltage between the first node and the second node according to a voltage value of the AC power source, and perform a step-down operation on the voltage according to the voltage value; at the end of the specific time period and in the positive half cycle, the controller controls the first bridge arm operating in the step-up operation and in the step-down operation.

3. The three-level power factor rectifier as claimed in claim 2, wherein in the step-up operation, the sequence of controlling the first bridge arm by the controller in a switching cycle is: turning off the fourth switch, turning on the second switch, turning off the third switch, and turning on the first switch; in the step-down operation, the sequency of controlling the first bridge arm by the controller in the switching cycle is: turning off the first switch, turning on the third switch, turning off the second switch, and turning on the fourth switch.

4. The three-level power factor rectifier as claimed in claim 1, wherein in a negative half cycle of the AC power source, the controller performs a step-down operation on a voltage between the first node and the second node according to a voltage value of the AC power source, and perform a step-up operation on the voltage according to the voltage value; at the end of the specific time period and in the negative half cycle, the controller controls the first bridge arm operating in the step-down operation and in the step-up operation.

5. The three-level power factor rectifier as claimed in claim 4, wherein in the step-down operation, the sequence of controlling the first bridge arm by the controller in a switching cycle is: turning off the first switch, turning on the third switch, turning off the second switch, and turning on the fourth switch; in the step-up operation, the sequency of controlling the first bridge arm by the controller in the switching cycle is: turning off the fourth switch, turning on the second switch, turning off the third switch, and turning on the first switch.

6. The three-level power factor rectifier as claimed in claim 1, wherein in the specific time period, the controller turns off the first switch and the fourth switch.

7. A three-level power factor rectifier, comprising:

a diode bridge arm comprising a first diode and a second diode connected in series, a bridge arm assembly connected to the diode bridge arm in parallel, the bridge arm assembly comprising:

a first bridge arm comprising a first switch, a second switch, a third switch, and a fourth switch connected in series and in sequence, and a second bridge arm connected to the second switch and the third switch in parallel, and the second bridge arm comprising a first freewheeling component and a second freewheeling component connected in series and in sequence, an input inductor coupled to a first node between the second switch and the third switch, coupled to a second node between the first diode and the second diode, and coupled to an input terminal that receiving an AC power source, a capacitor bank connected to the bridge arm assembly in parallel, and the capacitor bank comprising a first capacitor and a second capacitor connected in series and in sequence; a midpoint between the first capacitor and the second capacitor coupled to the first freewheeling component and the second freewheeling component, and a controller configured to operate the first bridge arm in a burst mode, and the burst mode comprising a burst period and a burst sleep period, wherein when the controller controls the first bridge arm operating in the burst sleep period, and the AC power source in a positive half cycle and a voltage value of the AC power source is greater than a first threshold, the controller turns on the first switch and the second switch;

when the controller controls the first bridge arm operating in the burst sleep period, and the AC power source in a negative half cycle and the voltage value of the AC power source is less than a second threshold, the controller turns on the third switch and the fourth switch.

8. The three-level power factor rectifier as claimed in claim 7, wherein in the burst sleep period, and the AC power source in the positive half cycle and the voltage value is greater than the first threshold, the controller turns off the third switch and the fourth switch.

9. The three-level power factor rectifier as claimed in claim 7, wherein in the burst sleep period, and the AC power source in the negative half cycle and the voltage value is less than the second threshold, the controller turns off the first switch and the second switch.

10. The three-level power factor rectifier as claimed in claim 7, wherein the first threshold is greater than a zero-crossing value of the AC power source, and the second threshold is less than the zero-crossing value; in the burst sleep period, when the voltage value of the AC power source is between the first threshold and the second threshold, the controller turns on the second switch and the third switch, and turns off the first switch and the fourth switch.

11. The three-level power factor rectifier as claimed in claim 7, wherein in the burst sleep period, the controller controls the first bridge arm operating in an operation frequency that is substantially twice a mains frequency; in the burst period, the operation frequency is greater than the mains frequency.

12. The three-level power factor rectifier as claimed in claim 7, wherein in the burst sleep period, the controller sets a first dead time under the transition of the first switch and the transition of the third switch, and sets a second dead time under the transition of the second switch and the transition of the fourth switch.

13. A method of operating a three-level power factor rectifier, the three-level power factor rectifier comprising a diode bridge arm, a bridge arm assembly, and a capacitor bank, and the bridge arm assembly comprising a first switch, a second switch, a third switch, and a fourth switch connected in series and in sequence to form a discharge path from an input inductor to the capacitor bank, the method comprising steps of:

turning on and turning off the first switch, the second switch, the third switch, and the fourth switch to convert an AC power source into a DC power source, determining that entering a burst mode since the three-level power factor rectifier operates in a light-load condition, and the burst mode comprises a burst period and a burst sleep period, turning on the first switch and the second switch in the burst sleep period, while the AC power source in a positive half cycle and a voltage value of the AC power source is greater than a first threshold, turning on the third switch and the fourth switch in the burst sleep period, while the AC power source in a negative half cycle and the voltage value of the AC power source is less than a second threshold, and turning on the second switch and the third switch for a specific time period when entering the burst period from the burst sleep period.

14. The method as claimed in claim 13, wherein a first node is formed between the second switch and the third switch, and a second node is formed between a first diode and a second diode of the diode bridge arm, the method further comprises steps of:

performing a step-up operation on a voltage between the first node and the second node according to the voltage value of the AC power source in the positive half cycle, performing a step-down operation on the voltage according to the voltage value in the positive half cycle, and controlling the first bridge arm operating in the step-up operation and the step-down operation at the end of the specific time period and in the positive half cycle.

15. The method as claimed in claim 13, wherein a first node is formed between the second switch and the third switch, and a second node is formed between a first diode and a second diode of the diode bridge arm, the method further comprises steps of:

performing a step-down operation on a voltage between the first node and the second node according to the voltage value of the AC power source in the negative half cycle, performing a step-up operation on the voltage according to the voltage value in the negative half cycle, and controlling the first bridge arm operating in the step-up operation and the step-down operation at the end of the specific time period and in the negative half cycle.

16. The method as claimed in claim 13, further comprising a step of:

turning off the first switch and the fourth switch in the specific time period.

17. The method as claimed in claim 13, further comprising steps of:

turning off the third switch and the fourth switch in the burst sleep period, and the AC power source in the positive half cycle and the voltage value is greater than the first threshold, turning off the first switch and the second switch in the burst sleep period, and the AC power source in the negative half cycle and the voltage value is less than the second threshold, and turning on the second switch and the third switch, and turning off the first switch and the fourth switch when the voltage value is between the first threshold and the second threshold, wherein the first threshold is greater than a zero-crossing value of the AC power source, and the second threshold is less than the zero-crossing value.

18. The method as claimed in claim 13, further comprising steps of:

setting a first dead time under the transition of the first switch and the transition of the third switch in the burst sleep period, and setting a second dead time under the transition of the second switch and the transition of the fourth switch in the burst sleep period.

* * * * *